No. 871,279. PATENTED NOV. 19, 1907.
W. H. KEYES.
FOOT REST FOR VEHICLES.
APPLICATION FILED SEPT. 14, 1906.
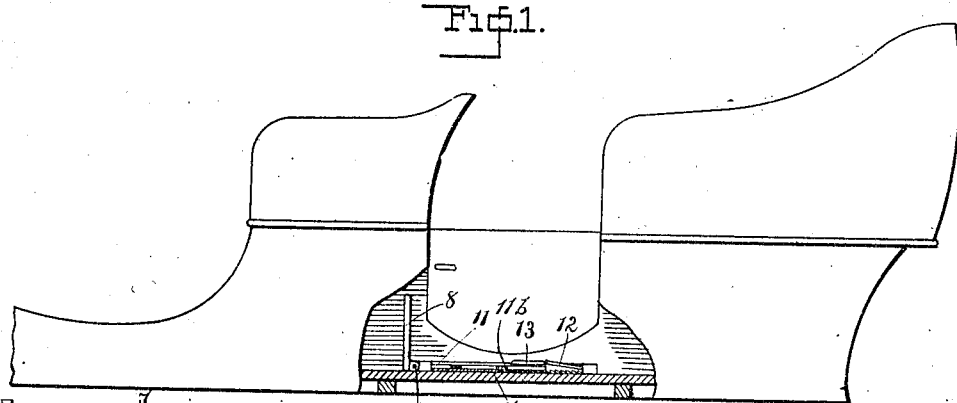
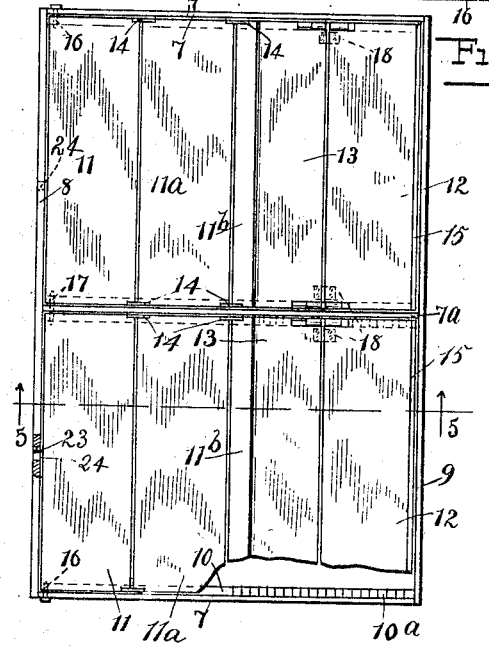
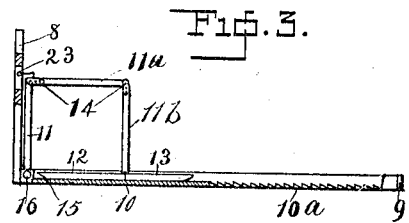
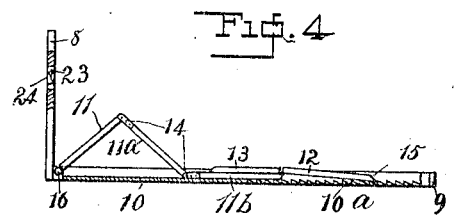
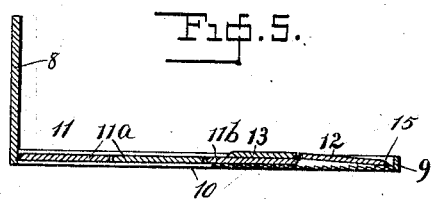
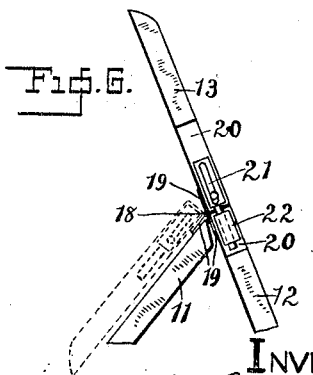
WITNESSES:
Matt M. Marty
Chas. F. Barrett
INVENTOR
W. H. Keyes
BY Frederick Benjamin
ATT'Y.

UNITED STATES PATENT OFFICE.

WILLIAM H. KEYES, OF CHICAGO, ILLINOIS.

FOOT-REST FOR VEHICLES.

No. 871,279.      Specification of Letters Patent.      Patented Nov. 19, 1907.

Application filed September 14, 1906. Serial No. 334,639.

*To all whom it may concern:*

Be it known that I, WILLIAM H. KEYES, citizen of the United States, residing at Chicago, in the county of Cook and State of Illinois, have invented certain new and useful Improvements in Foot-Rests for Vehicles, of which the following is a specification.

My invention relates to foot-rests for vehicles and its chief objects are to provide a removable foot-rest that can be readily folded into a small compass when not in use; to produce a device that can be readily and easily adjusted to a great variety of positions to suit variations in the stature of passengers; to furnish means for readily adjusting the device to form a seat; and to provide a simple and durable apparatus for the purpose specified.

It is a matter of common observation that the seats of the majority of passenger vehicles of every variety afford a comfortable position for only a limited number of persons carried. As they are constructed for the average person those who vary from that standard suffer more or less inconvenience in keeping their position upon the ordinary vehicle seat. This holds true especially in certain classes of vehicles such as automobiles and passenger coaches, to both of which my improved device is especially applicable. In many cases the seats are deep from front to rear and are frequently made so high that even the average person is uncomfortable when occupying one of them. Vehicles of this class usually move at a high rate of speed and the occupants are forced to greater exertions to keep their seats properly and in addition the habitually long journeys to which these vehicles are adapted are fatiguing to the passenger that is not provided with a seat properly adapted to his stature. A convenient foot-rest will give ease and comfort by affording a stable seat. I overcome these disadvantages and reach the results hereinbefore stated by the use of the device illustrated in the accompanying drawing which forms a part of this specification and in which:—

Figure 1 is a view of an automobile body supplied with my removable adjustable foot-rest and seat, a portion of the side of the vehicle body being broken away to show the relative position of the device; Fig. 2 is a plan view of my invention, a portion being broken away to disclose the ratchet; Fig. 3 is a side view showing the apparatus adjusted as a seat, with the side of the frame broken away; Fig. 4 is a side view of the device in one of its positions as a foot-rest; Fig. 5 is a sectional view taken on the line 5—5 of Fig. 2, and Fig. 6 is an enlarged fragmentary view showing the locking bolt for the rear members.

Referring to the drawing, the numeral 7 indicates the side pieces of a rectangular frame composed of angle pieces, joined in front by a vertically disposed plate 8 and held together at the rear by a connecting bar 9. The plate 8 and the bar 9 are joined in the median line by a double-angled piece 7ª, dividing the frame into two equal portions or sections. The side pieces and the central piece 7ª are so disposed that their flanges 10 are in a horizontal position and serve to support the ends of comparatively thin boards 11, 11ª, 11ᵇ, 12, 13, which are placed edge to edge and are adapted to lie flat upon said flanges within the frame when not in use, in which position they are protected by the sides and ends of the frame.

I prefer to employ five boards for each section of the frame, although this number may be varied to suit different sizes of vehicles. The boards 11, 11ª, and 11ᵇ, are flexibly joined to each other by plate hinges 14 which permit a free movement of the boards upon each other in either direction. The flanges 10 are furnished on their upper surfaces with ratchet teeth 10ª which extend substantially half the length of the side pieces and are adapted to be engaged by the free edge of the board 12 which is beveled for that purpose. The first board 11 is hinged to the side pieces 7 and to the middle piece 7ª by pintles 16 and 17 respectively. The boards 11ᵇ, 12 and 13 are connected in the manner shown by hinges 18 which have three leaves 19 each of said leaves being secured to the contiguous margin of one of the said boards in any suitable manner as shown in Fig. 6. In order to provide means for rigidly securing the boards 12 and 13 in the same plane their edges are provided with notches 20 in which are mounted slide bolts 21 and a socket catch 22 secured to the boards 12 and 13 respectively. When the said bolt is withdrawn from its socket the board 13 may take the position shown by the dotted lines in Fig. 6. In order to render the device sufficiently stable when adjusted to the position of a seat as seen in Fig. 3, a hook 23 is mounted in a notch 24 in the plate 8 and is adapted to engage the margin of the board 11.

In using the device the frame containing the assembled members is placed upon the floor of the vehicle immediately in front of the seat, where the boards will lie flat when not in use, thus being entirely out of the way. In this position the appliance will afford a protection for the floor by adding strength thereto and when applied to an automobile the frame can be readily slid forward or backward to give access to the transmission, or the appliance can be removed altogether. When in place, whether folded or in any adjusted position the floor covering commonly used can be placed above it the only change required being that the mat or carpet would necessarily be divided to correspond in number to the sections. It will be obvious that the several members may be placed in a great variety of positions to suit special circumstances and either section may be used entirely independently of the other. Thus different adjustments may be made simultaneously or one side may be arranged as a seat while the other section is utilized as a foot-rest. Ordinarily when the adjustment is made to the desired height the edge 15 of the member 12 will automatically engage the ratchet teeth $10^a$ and thus hold the boards firmly in the desired position.

It is obvious that many changes may be made in the devices of my invention as herein developed without departing from the spirit and scope thereof and I do not wish, therefore, to be limited to the precise construction set forth.

Having thus described my invention what I claim is:—

1. A foot-rest consisting of a rectangular frame, a plurality of adjustable members mounted on said frame and arranged in parallel series, each series composed of a front board hinged on the frame, and complementary boards hingedly connected with each other and with the front board, and means on said frame for holding the rear board of each series in its adjusted position.

2. A foot-rest consisting of a rectangular frame, a plurality of adjustable members mounted on said frame and arranged in parallel series, each series composed of a front board hinged on the frame, and complementary boards hingedly connected with each other and with the front board, means on said frame for holding the rear board of each series in its adjusted position, and means for locking two of said boards in a common plane.

3. A foot-rest consisting of a rectangular frame, a fixed vertical member secured to said frame, a plurality of adjustable members mounted on said frame and arranged in independent parallel series, each series composed of a front board hinged on the frame and complementary boards hingedly connected with each other and with the front board, means for locking said members on said vertical board, and means on said frame for holding said members in their adjusted position.

In testimony whereof I affix my signature in presence of two witnesses.

WILLIAM H. KEYES.

Witnesses:
 Mrs. F. H. HINTON,
 F. BENJAMIN.